United States Patent [19]

Filreis et al.

[11] 4,423,918

[45] Jan. 3, 1984

[54] RE-ENTERABLE SERVICE WIRE SPLICE CLOSURE

[75] Inventors: Manuel Filreis, Edina; William J. Seim, Roseville, both of Minn.

[73] Assignee: Minnesota Mining & Manufacturing Company, St. Paul, Minn.

[21] Appl. No.: 293,862

[22] Filed: Aug. 18, 1981

[51] Int. Cl.³ .............................................. H01R 4/22
[52] U.S. Cl. ..................................... 339/97 P; 174/91; 339/98; 339/115 R
[58] Field of Search ........... 339/115 R, 115 C, 117 R, 339/14 R, 14 L, 97 R, 97 P, 98, 99 R; 174/91

[56] References Cited

U.S. PATENT DOCUMENTS

| | | | |
|---|---|---|---|
| 1,568,783 | 1/1926 | Thompson. | |
| 2,333,266 | 11/1943 | Miller | 339/95 R |
| 2,700,142 | 1/1955 | Benander | 339/99 R |
| 2,742,549 | 12/1955 | Peters | 339/97 P |
| 3,012,219 | 12/1961 | Levin et al. | 339/98 |
| 3,202,957 | 8/1965 | Leach | 339/98 |
| 3,253,247 | 5/1966 | Vos | 339/95 |
| 3,617,612 | 11/1971 | Patton | 174/59 |
| 3,656,088 | 4/1972 | Seim | 339/98 |
| 3,715,450 | 2/1973 | Martin | 174/59 |
| 3,778,749 | 12/1973 | Kapell | 339/97 R |
| 3,864,009 | 2/1975 | Wickenberg | 339/95 R |
| 3,879,575 | 4/1975 | Dobbin et al. | 174/23 C |
| 3,897,993 | 8/1975 | Fleischhacker et al. | 339/99 R |
| 3,934,076 | 1/1976 | Smith | 174/87 |
| 3,937,870 | 2/1976 | Bumpstead et al. | 174/87 |
| 4,010,994 | 6/1975 | Aysta | 339/36 |
| 4,039,742 | 8/1977 | Smith | 174/87 |
| 4,075,417 | 2/1978 | Neale, Sr. | 339/98 |
| 4,157,208 | 6/1979 | Roberts et al. | 339/117 R |
| 4,186,986 | 2/1980 | Shoemaker | 339/117 R |

Primary Examiner—John McQuade
Assistant Examiner—Paula Austin
Attorney, Agent, or Firm—Donald M. Sell; James A. Smith; John C. Barnes

[57] ABSTRACT

Re-enterable service wire splice closure having a shallow cup containing a sealant into which is placed an inverted cylindrical shallow tray containing the spliced ends of the service wire, the cup and the tray have aligned slots through which the cable may extend and a screw cap drives the tray into the cup forcing the sealant around the wire splice connectors to encapsulate the same for moisture resistance. A connector element in the tray serves as the strain relief element for the service wire and as the connector element for the grounding shield.

14 Claims, 8 Drawing Figures

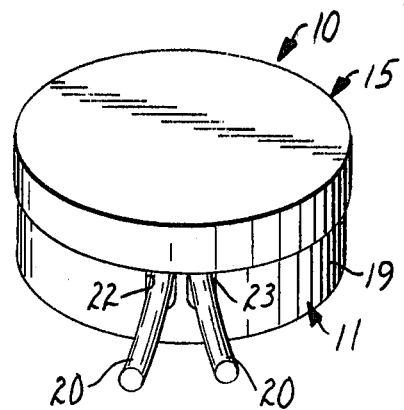
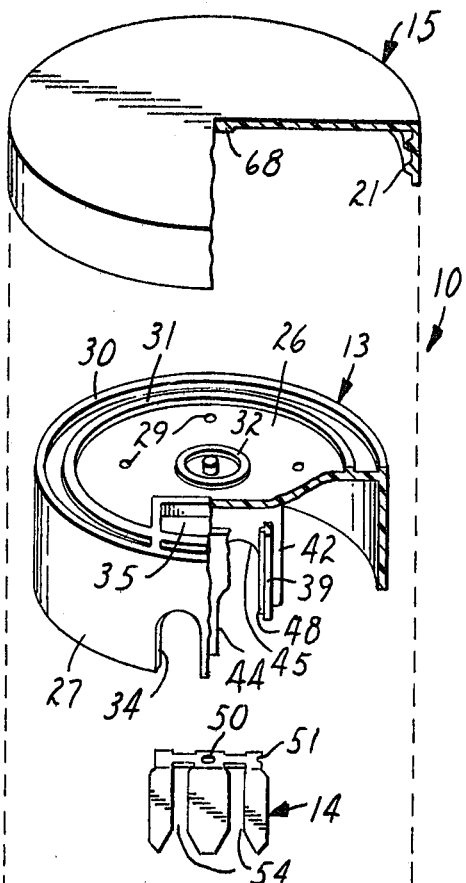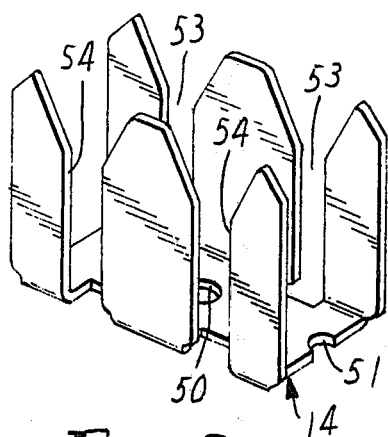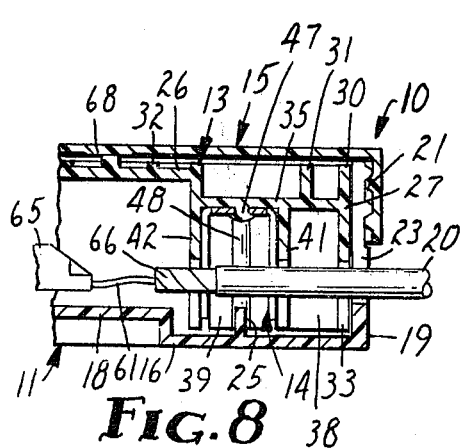

RE-ENTERABLE SERVICE WIRE SPLICE CLOSURE

DESCRIPTION

1. Technical Field

This invention relates to an improved re-enterable service wire splice closure, and in one aspect to a splice closure which may be easily applied over the finished splice and readily sealed in the protective sealant without creating a mess, and in another aspect also, a splice closure kit for enclosing a splice in the field which will restrict moisture from reaching the conductors spliced together and allows the splice to be buried.

2. Background Art

The present invention relates to the enclosure of the splice in telephone service wires in a moisture-resistant closure such that the same may be buried without moisture reaching the conductors. It is a further purpose of the present invention to provide a re-enterable closure for the splice such that the same may be inspected or checked.

It is important that the telephone conductors at the splice points are protected from moisture causing corrosion of the conductors and interruption of telephone service.

There have been a number of such closures proposed and all re-enterable closures use a sealant which is purposely adapted to envelop the entire splice point in a water-proof mass and restrict moisture from infiltrating the closure to the spliced point. One such closure is disclosed in U.S. Pat. No. 3,879,575, which illustrates a clam shell-type structure wherein two halves of a cylindrical closure are filled with the compound and the connected service wires are placed in wire-receiving channels and the halves are folded one on top of the other to encapsulate the splices. Such a structure necessarily requires the use of spring clips or other fasteners, and an abundance of the sealant material to assure complete removal of voids or air pockets in the closure. The splice closures are improved when force may be applied to drive the splice connectors and the service wire ends into the grease such that it forces the grease to coat the conductors and wire ends, assuring the removal of air and increasing the resistance to the ingress of the moisture. Such a closure is disclosed in U.S. Pat. No. 3,934,076, wherein a vial filled with a sealant receives the spliced ends of a service wire which are restrained in a cap that is screwed down over the open end of the vial. The relative movement of the cap and vial drives the wire ends and the conductor connectors into the sealant. The difficulty however with this closure is that the wires or the sealant has relative movement tending to leave a void directly behind the wires or along the length of the wires as the relative rotation takes place, thus not insuring the desired seal to restrict moisture from entering the closure. Another such closure is available from Preformed Lined Products of Cleveland, Oh. and sold under the tradename "Serviseal".

Other disadvantages to some of the earlier closures are that a portion of the closure must be placed onto the service wires prior to making the splice, and if the service man in the field forgets to insert the portion of the closure onto the service wire cables before making the splice, then the splice must be redone to insert this closure element. One example of such a closure is shown in U.S. Pat. No. 3,937,870. Here a plug 20 is inserted over the service wires prior to forming the splice and then the ends of the wires and a portion of the plug is placed in the casing 14 containing the potting material and forced down into the potting material until the plug is locked in place by ears 41. There is no relative movement between the plug and the casing except for the telescoping movement. The forces necessary to place the same in the casing is applied externally. Such closures, suitable for potting compounds which are typically liquid in form when the splice is immersed in the closure, do not require pressure to drive the sealant into the interstices of the splice elements. Such closures are not re-enterable because the compound hardens, potting the splice within the closure. When using a viscous sealant, it is necessary to apply sufficient pressure to force the sealant into all of the interstices of the splice, and to actually coat or encapsulate the service wires adjacent the cable-receiving slots or channels such that exposure of the splice to moisture is restricted.

A further piece of prior art where a plug is inserted into a casing filled with sealant is U.S. Pat. No. 4,010,994. This patent discloses a plug which is a connector for a multiplicity of conductors and it is pressed into the cavity of the casing and into the sealant disposed therein by the use of upstanding levers on the casing, which levers force the plug into the encapsulating material and drive the same around the plug to completely fill the interstices of the connector.

U.S. Pat. No. 4,039,742 shows a cable splice closure comprising a cap through which the cables are inserted, a two piece clamp to fix the cables together, an optional sleeve 13 is slipped over the splice and clamp. The assembly is then telescopically inserted into the body of sealant in the vial 14. The sleeve and vial are sealed to the cap in grooves and a retainer locks the cap to the vial. This closure is made by driving the parts together and no mechanical aid is provided to assure good encapsulation of the splice in the sealant.

The present invention is directed to the re-enterable splice closure, affording a quick connection of the service wire shields, strain relief for the service wire sheath, and a facile encapsulation of the splice by placing the splice in the body of sealant material, and driving the members together by simple rotation of a cover on the closure without causing relative rotation between the service wires and the body for the sealant.

DISCLOSURE OF INVENTION

A splice closure kit according to the present invention comprises a shallow cup containing a sealant for encapsulating preconnected conductors of insulated cables or service wires, a shallow tray in which is disposed a spring compression reserve contact element adapted to receive the ends of the cables or service wires to secure the sheaths of the joined cables or wires and to electrically connect the shields of the cables or wires. The tray is adapted to be received in the cup and has slotted side walls which are aligned with slotted side walls in the cup to permit the wires to extend generally radially from the cup. A cover is threaded onto the cup to drive the tray and the splice elements into the sealant.

Baffles are provided adjacent the slotted side walls, affording a labyrinth path for resisting escape of the sealant as the tray is forced into the cup and subsequent entry of any material into the closure. The flashings adjacent the slots in the cup provide a further seal about the wires entering the closure.

The cover is threaded internally to fit the external threads on the cup to force the tray carrying the splice connectors into the sealant. The cover has a size to be easily handled and as the force is applied by the cover being threaded onto the cup to drive the tray into the sealant, there is no rotational movement between the ends of the cable or service wire and the cup containing the sealant.

BRIEF DESCRIPTION OF THE DRAWINGS

The present invention will be more fully described below with reference to the accompanying drawing wherein:

FIG. 1 is a perspective view of the re-enterable moisture-proofing closure for service wire splices constructed according to the present invention showing the preconnected service wire extending from the closure;

FIG. 2 is an exploded view of the four parts of the closure of the present invention;

FIG. 3 is a detail perspective view of the contact element;

FIG. 8 is a fragmentary cross-sectional view of the closure with the members assembled.

BEST MODE OF CARRYING OUT THE INVENTION

Figure 4:
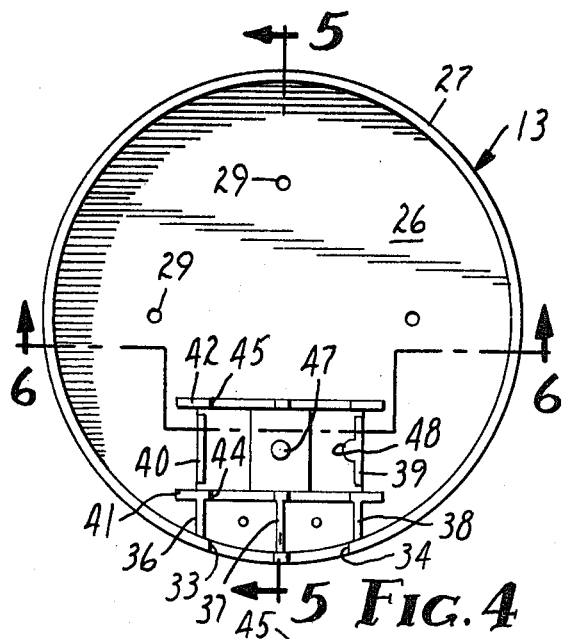
FIG. 4 is a plan view of the tray.
Figure 5:
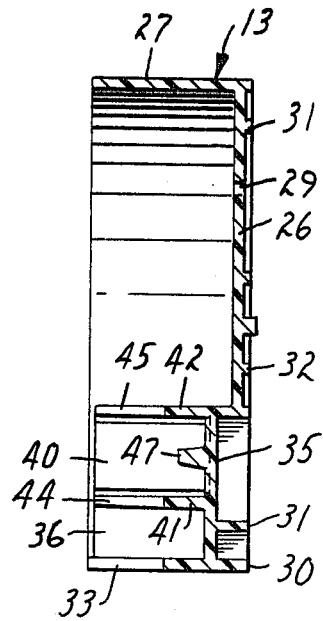
FIG. 5 is a cross-sectional view of the tray taken along the lines 5—5 of FIG. 4.
Figure 6:
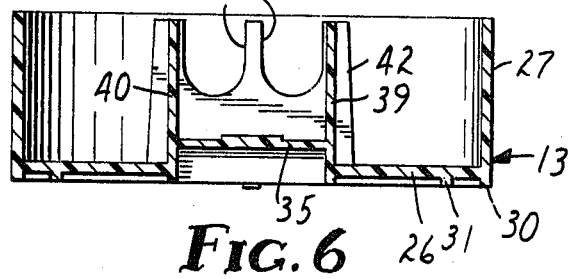
FIG. 6 is a transverse sectional view taken along the lines 6—6 of FIG. 4.

The re-enterable closure for preconnected conductor splices of service wires, generally designated 10, is illustrated in FIG. 1 in the operative assembled position. The closure is provided as a three-part kit to the field service man for enclosing the splices made in service wires and comprises a shallow cylindrical cup 11, a shallow cylindrical tray 13 containing a contact element 14, and a cover 15.

The shallow cup 11 has a generally circular bottom wall 16 with a recessed central portion 18, and cylindrical side walls 19 having an externally threaded free edge for receiving the internally threaded cover 15, as indicated by the threads 21. The side walls 19 are also provided with two spaced axially extending wire receiving slotted openings 22 and 23 (FIG. 1 and FIG. 2) adapted to receive the service wires 20. Initially the slots 22 and 23 are partially closed by the flashing 24 of the mold to help in retaining the sealant within the cup 11, which sealant substantially fills this cup and provides the moisture barrier for coating and encapsulating the conductor splices. The recessed wall 18 is not completely circular and there is a rectangular portion of the wall 16 adjacent the slots 22 and 23 for receiving baffle plates in the tray 13 and the contact element as will hereinafter be described. Projecting however from the bottom wall 16 in this rectangular section is a projecting bar 25 which aids to secure the service wire in the contact element 14.

The cup 11 is filled with a predetermined amount of sealant (not shown) which will afford a moisture-resistant barrier within the cup, restricting the ingress of moisture into the sealed closure, to protect the conductors by encapsulating the same within the closure. The sealant may comprise an encapsulating grease which is insoluble in water, having a high dielectric strength and thixotropic properties, with a static viscosity in about the one to one and one-half million centipoise range, and a penetrometer reading in the range of 200 to 300. An example of such grease may be a petroleum grease such as Superior Lub No. 2, sold by Fiske Brothers Refining Company, Newark, N.J.

The shallow tray 13 comprises a generally circular bottom wall 26 and cylindrical side walls 27 projecting from the peripheral edges of said bottom wall. The bottom wall 26 is formed with a plurality of spaced openings 29, and several annular rings as exemplified by 30, 31 and 32, which provide recesses for retaining portions of the sealant that is forced through the openings 29. The gate of the mold for the tray leaves a projection within the center of ring 32. The cylindrical walls 27 are provided with axially extending spaced slots 33 and 34 which receive the service wire and which do not extend as deeply into the side walls as the similar slots 22 and 23 in the cup 11. Projecting into the tray from an offset generally rectangular bottom wall 35 in the bottom wall 26 of the tray 13 are a plurality of parallel baffles which restrict the flow of the sealant from the slots 33 and 34, and from the slots 22 and 23, upon assembly of the closure, and which serve to form a labyrinth for any foreign matter migrating into the closure for the connectors of the splice. The baffles are illustrated in FIGS. 2, 4, 5, 6 and 7, and are identified by the reference numerals 36, 37, 38, 39, 40, 41 and 42. Baffles 41 and 42 are also provided with generally axially extending slots 44 and 45, to receive the service wires. Between the baffles 41 and 42 is a projecting stud 47 which supports the contact element 14 on a central raised bar between the baffles 41 and 42. The spring contact element 14 is positioned by a boss 48 adjacent the wall 39. As illustrated, the diameter of the bottom wall 26 of the tray 13 is smaller than the inside diameter of the cylindrical wall 19 of the cup 11 such that the tray 13 may be received telescopically within the cup and be driven into the cup 11.

The spring compression reserve contact element 14 is supported on the stud 47 and is retained within the tray. This contact element 14 is formed of a conductive resilient metal such as tin plated spring steel, and is provided with a central opening 50 to receive the stud 47, and a detent 51 to cooperate with the boss 48 to position the contact element 14 properly in the tray. The contact element is provided with spaced opposed inner and outer wire-receiving slots 53 and 54, respectively, as viewed in FIGS. 3 and 7, to grasp the service wire. The slots 53 and 54 are defined by upstanding legs projecting from the center plate and formed from a single stamping which may be from, for example, 0.020 inch spring steel. The wire-receiving slots 53 are narrower than the slots 54. As viewed in FIG. 7, when the service wires 20 are placed in the tray 13 they have been stripped to expose the plurality of conductors 61 within the service wire, and the matching pairs of the conductors 61 are connected by connector elements 65. The sheath on the service wire 20 is secured in the slots 54 and the exposed grounding shield 66 is pressed into the slots 53 to electrically connect the grounding shield 66 on each of the service wires 20.

It should be noted that slotted openings are formed between the baffles 39 and 40, and the baffles 41 and 42 to permit expansion of the leg of the contact elements as the sheath and shields are forced into the cable-receiving slots.

The slots 54 provide strain relief by tightly gripping the outer sheath of the service wires 20 to secure the service wires 20 in the closure and remove any strain or tension on the wire from being transferred to the conductors joined by the contact elements 65 or to the shield connection.

Figure 7:
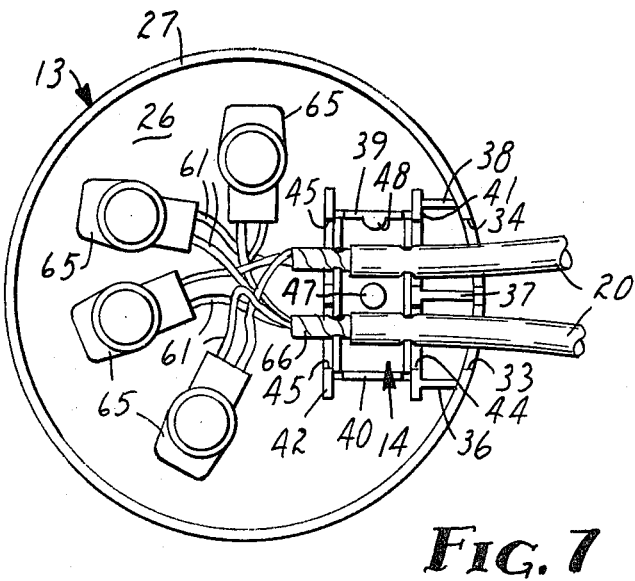
FIG. 7 is a plan view of the service wires and conductor connectors being inserted into the contact element in the tray.

After the spliced service wires 20 are placed in the contact element 14, as shown in FIG. 7, the clean dry tray 13 is inverted, as illustrated in FIG. 2, and the ends of the service wires, the contact element 14, and connector elements 65 are forced into the sealant in the cup 11. After they have been forced into the sealant as far as possible and adequately to permit the cover 15 to be threaded onto the cylindrical side walls 19 of the cup 11, the tray is forced by means of the cover into the sealant. The cover 15 has a centrally positioned boss 68 which engages the projection in the center of ring 32 of the tray and forces the tray downward. As this is accomlished, the sealant is displaced by the connector elements 65, the baffles and the raised bottom wall 35 and the sealant is forced through the holes 29 into the spaces between the cover and the rings 30 and 31, and the sealant is forced around each of the connectors 65. Sealant is forced through the slotted openings 33 and 34, and 22 and 23, to encapsulate the cable or wire ends forming a moisture-resistant closure for the splice. In the assembled position the elements are shown in section in FIG. 8 with the service wires 20 in place in the contact element 14 and with the tray 13 placed inside of the cup 11. The cover 15 fits tightly down onto the cup 11, securing the members together. The boss 68 and projection on the tray cause the circular cover to serve as a spring maintaining a biasing force on the tray.

The rotation of the cover 15 forces the tray 13 directly into the sealant. There is no relative movement between the service wires or the contact elements 65 and the sealant except for the sealant being forced about the contact elements and into any interstices within the tray 13 as the same is forced into the cup, and excess sealant is forced from the slotted openings 22 and 23.

The contact element in a preferred embodiment will be designed to receive service wires from 0.220 inch to 0.370 inch in diameter, with various numbers of conductors in the cable.

The tray 13 can have a rectangular or other noncircular shape for the side walls, so long as the tray will fit in the cup. The tray and cup may also have slots spaced about the side walls to afford an in-line splice between cables or service wires.

Having thus disclosed the preferred embodiment of the present invention it will be understood that other changes may be made without departing from the spirit or scope of the present invention.

We claim:

1. A re-enterable moisture-resistant closure for conductor splices between preconnected wires of a cable, said closure comprising
    a shallow cup having a bottom wall and a cylindrical side wall formed with threads adjacent the open end of the cup and said side wall having a plurality of wire-receiving slots extending from the open end of the cup toward the bottom wall,
    a sealant substantially filling said cup,
    a tray having a size to receive the conductor splices and having a size to fit within said cup, said tray having side walls having a plurality of wire-receiving slots therein extending from the free edge of said side walls for alignment with the slots in said cup, said tray receiving said spliced wires being inverted into said cup, and
    a cover adapted to matingly and threadably engage the threads on said cup to urge said tray, when inverted, into said cup to encapsulate a splice within said cup.

2. A re-enterable moisture-resistant closure according to claim 1 wherein said tray is provided with spaced parallel baffles adjacent said wire-receiving slots to impeded the flow of sealant through said slots.

3. A re-enterable moisture-resistant closure according to claim 1 or 2 wherein a spring compression reserve conductive contact element is supported in said tray adjacent said wire-receiving slots, said element having aligned cable receiving grooves of different width to receive said cables and secure the ends thereof in said tray affording strain relief.

4. A re-enterable moisture-resistant closure according to claim 1 wherein said tray has cylindrical side walls and said wire-receiving slots are positioned in closely spaced parallel relationship, and said closure comprises a spring compression reserve conductive contact element supported in said tray adjacent said wire-receiving slots, said element having pairs of aligned cable-receiving grooves defined by slots cut in a U-shaped metal plate, the grooves on one side of the U having a width narrower than the grooves on the side adjacent said wire-receiving slots in said tray for connection to said cable for strain relief.

5. A re-enterable moisture-resistant closure according to claim 4 wherein pairs of baffle plates are positioned in said tray adjacent opposite sides of said contact element and between said contact element and said side walls to restrict flow of sealant through said wire-receiving slots.

6. A re-enterable moisture-resistant closure according to claim 1 wherein said wire-receiving slots are formed in thin flexible material defining said side walls at said slots and said inverted tray and said cup accommodate various diameter cables.

7. A re-enterable moisture-resistant closure according to claim 1 or 6 including means cooperating between said tray and cover for biasing said tray into said cup for retaining the cable ends in said wire-receiving slots.

8. A re-enterable moisture-resistant closure for conductor splices between service wires having an insulating sheath and grounding shield, said closure comprising
    a shallow cylindrical cup having a circular recessed bottom wall and a cylindrical side wall formed with threads adjacent the open end of the cup and said side wall having a plurality of slots extending from the open end of the cup toward the bottom wall,
    a sealant substantially filling said cup,
    a shallow cylindrical tray having a generally circular bottom wall, having an opening therein and a diameter less than the diameter of the bottom wall of said cup, cylindrical side walls extending from said bottom wall, said side walls having a plurality of slots therein extending from the free edge of said side walls toward said bottom wall, and a plurality of parallel baffles supported from the bottom wall and projecting toward the open side of said tray and positioned adjacent said slots, said baffles having cable-receiving slots therein,
    a spring compression reserve conductive contact element supported on said tray and between pairs of said baffles for receiving the cables to be spliced, said contact element comprising spaced multiple-slotted planar legs providing spaced opposed inner and outer wire-receiving slots, wherein the wire-receiving slots in said outer contact element leg adjacent said side walls are in-line with and greater in width than the corresponding slots of the inner leg, which wire-receiving slots are adapted to receive and resiliently engage said sheath and shield of said service wires, respectively, and a cover adapted to matingly and threadly engage the threads on said cup to urge said tray, when inverted, into said cup to enclose a splice within said cup and retain the sheaths of said cables in said tray.

9. A re-enterable moisture-resistant closure for service wires according to claim 8 including means cooperating between said tray and said cover for biasing said tray toward the bottom wall of said cup.

10. A re-enterable moisture-resistant closure according to claim 1 or 8 wherein said tray has wall means positioned within said tray adjacent said side walls for displacing sealant when said tray is forced into said cup for filling said slots in said cup and tray with said sealant and encapsulating said wire ends.

11. A re-enterable moisture-resistant closure for conductor splices between preconnected wires of a cable, said closure comprising a shallow cup having a bottom wall and a cylindrical side wall formed with threads adjacent the open end of the cup and said side wall having a plurality of wire-receiving slots extending from the open end of the cup toward the bottom wall, a sealant substantially filling said cup, a tray having a size to receive the conductor splices and having a size to fit within said side walls of said cup, said tray having a bottom wall and side walls, said side walls having a plurality of wire-receiving slots therein extending from the free edge of said side walls for alignment with the slots in said cup and having spaced parallel baffles adjacent said wire-receiving slots to impede the flow of sealant through said slots, said tray receiving said spliced wires being inverted into said cup, and a cover adapted to matingly and threadably engage the threads on said cup to urge said tray, when inverted, into said cup and sealant to encapsulate a splice within said cup.

12. A re-enterable moisture-resistant closure according to claim 11 wherein said tray has cylindrical side walls and said wire-receiving slots are positioned in closely spaced parallel relationship, and said closure comprises a spring compression reserve conductive contact element supported in said tray adjacent said wire-receiving slots, said element having pairs of aligned cable-receiving grooves defined by slots cut in a U-shaped metal plate, the grooves on one side of the U having a width narrower than the grooves on the side adjacent said wire-receiving slots in said tray for connection to said cable for strain relief.

13. A re-enterable moisture-resistant closure according to claim 12 wherein pairs of baffle plates are positioned in said tray adjacent opposite sides of said contact element and between said contact element and said cylindrical side walls of said tray to restrict flow of sealant through said wire-receiving slots, said plates having slots to accommodate the cable placed in said grooves.

14. A re-enterable moisture-resistant closure according to claim 11 wherein said tray comprises a projection on said bottom wall projecting in a direction opposite said side walls to engage said cover when inverted into said cup for biasing said tray into said cup when said cover is threaded onto said cup.

* * * * *